United States Patent
Galasso

(10) Patent No.: US 8,078,687 B1
(45) Date of Patent: Dec. 13, 2011

(54) SYSTEM AND METHOD FOR DATA MANAGEMENT

(75) Inventor: Leonard J. Galasso, Trabuco Canyon, CA (US)

(73) Assignee: Marvell International Ltd., Hamilton (BM)

( * ) Notice: Subject to any disclaimer, the term of this patent is extended or adjusted under 35 U.S.C. 154(b) by 532 days.

(21) Appl. No.: 11/516,191

(22) Filed: Sep. 6, 2006

(51) Int. Cl.
*G06F 15/167* (2006.01)

(52) U.S. Cl. ........ 709/216; 709/217; 709/223; 709/224; 707/791; 707/792; 707/793; 707/796; 707/800

(58) Field of Classification Search .................. 709/216, 709/217, 223, 224; 707/791–800
See application file for complete search history.

(56) References Cited

U.S. PATENT DOCUMENTS

| | | | |
|---|---|---|---|
| 5,664,177 A * | 9/1997 | Lowry | 707/100 |
| 5,950,191 A * | 9/1999 | Schwartz | 707/3 |
| 6,370,601 B1 * | 4/2002 | Baxter | 710/65 |
| 6,629,114 B2 * | 9/2003 | Ramakrishnan | 707/206 |
| 6,687,804 B1 * | 2/2004 | Kosaki | 711/172 |
| 2002/0087673 A1 * | 7/2002 | Selkirk et al. | 709/223 |
| 2004/0103086 A1 * | 5/2004 | Vinnakota et al. | 707/3 |
| 2005/0171937 A1 * | 8/2005 | Hughes et al. | 707/3 |

* cited by examiner

*Primary Examiner* — Yves Dalencourt
*Assistant Examiner* — Michael C Lai

(57) ABSTRACT

A data management system for a data storage device includes a management module and a memory module. The management module manages a plurality of nodes of a linked list based on one of a plurality of parameter sets that indicates a location of a data field within each of the plurality of nodes. The memory module stores data indicative of the one of the plurality of parameter sets.

39 Claims, 12 Drawing Sheets

| | Node Length | Node Width | Offset to Sort Field | Width of Sort Field | Offset to Next Pointer | Offset to Previous Pointer |
|---|---|---|---|---|---|---|
| Context 1 | 32 | 20 | 12 | 4 | 8 | 64 |
| • | | | | | | |
| • | | | | | | |
| • | | | | | | |
| Context n | 32 | 20 | 20 | 8 | 8 | 64 |

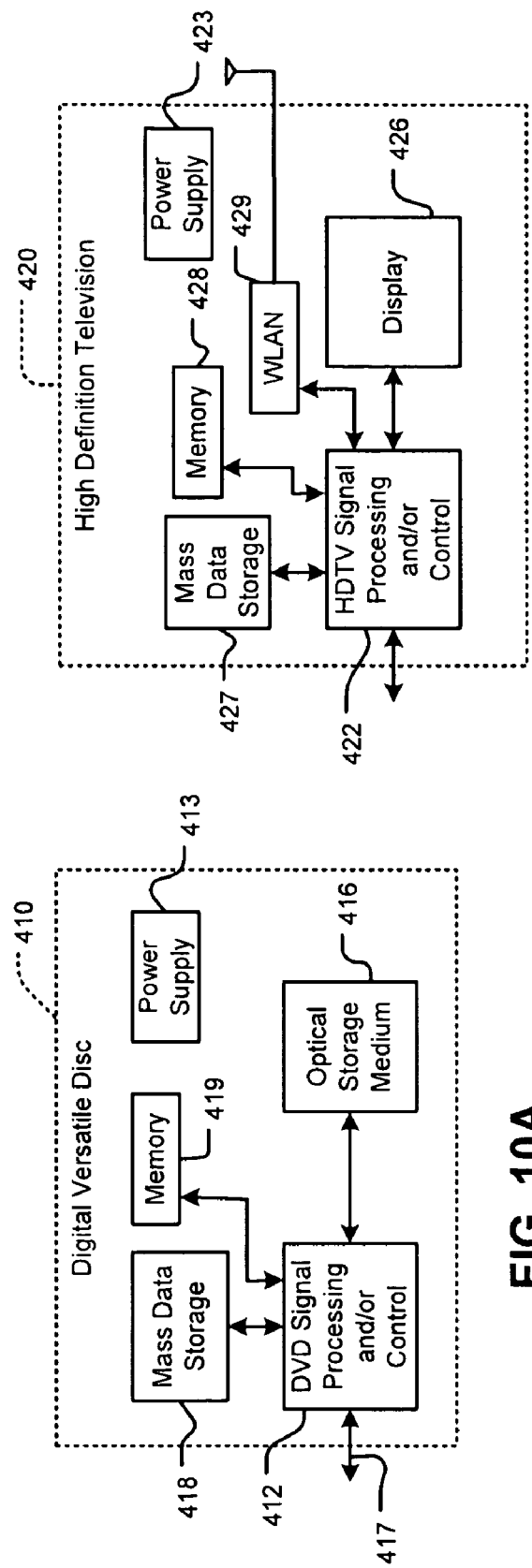

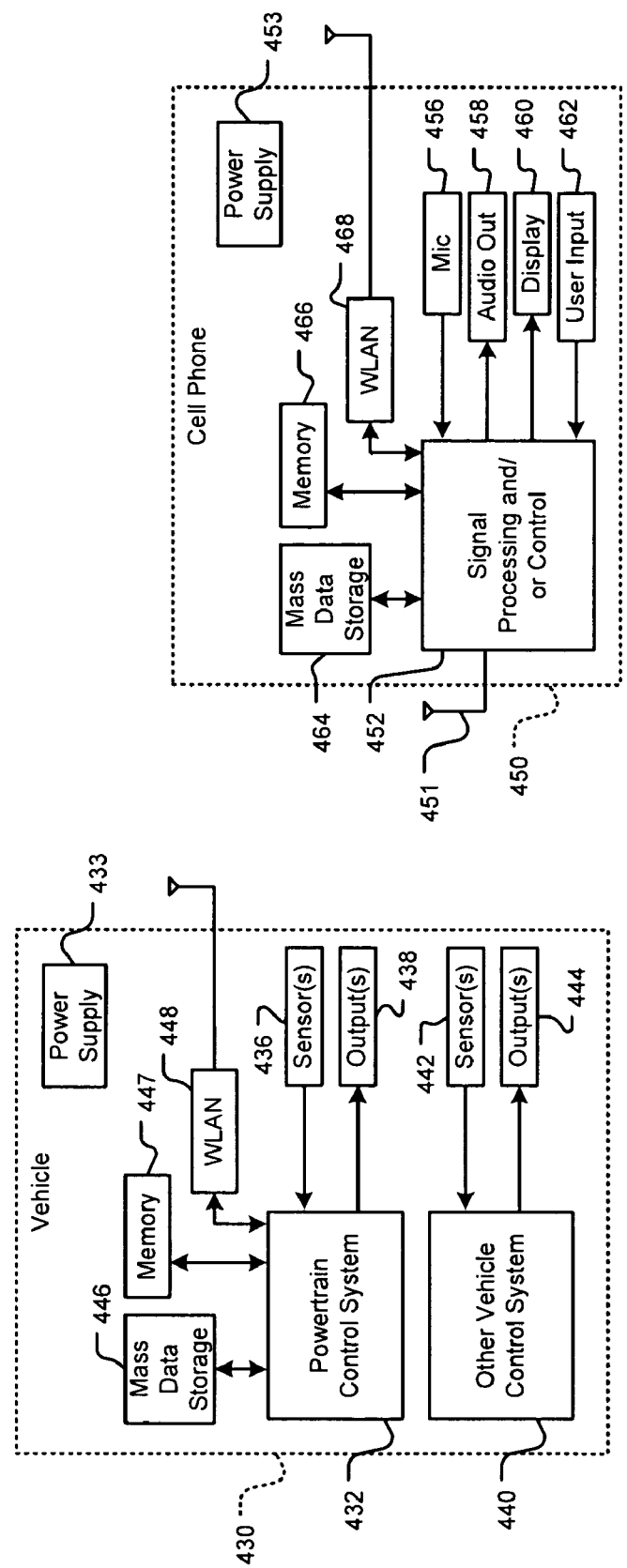

SYSTEM AND METHOD FOR DATA MANAGEMENT

The present disclosure relates generally to storage device controllers, and more particularly to efficient data management systems for storage device controllers.

BACKGROUND

Host devices such as computers, laptops, personal video recorders (PVRs), MP3 players, game consoles, servers, set-top boxes, digital cameras, and/or other electronic devices often need to store a large amount of data. Storage devices such as hard disk drives (HDD) may be used to meet these storage requirements.

A hard disk controller (HDC) communicates with the storage device and the host system. The HDC manages interaction between the storage device and the host system. Communication between the host system and the HDC is usually provided using one of a variety of standard I/O bus interfaces. Typically, when data is read from a storage device, a host system sends a read command to the HDC, which stores the read command into a buffer memory. Data is read from the storage device and stored in the buffer memory.

Linked lists (e.g. a queue of fiber channel frames) can manage the flow of data from the host system to the storage device. Referring now to FIG. 1, an exemplary linked list 10 is shown to include nodes 20-1, 20-2, . . . , and 20-n, referred to collectively as nodes 20. The nodes 20 include previous pointers 30-1, 30-2, . . . , and 30-n, referred to collectively as previous pointers 30, and next pointers 40-1, 40-2, . . . , and 40-n, referred to collectively as next pointers 40. The previous pointers 30 store addresses of nodes including the previous data values in the linked list 10 relative to a current node. The next pointers 40 store addresses of nodes containing the next data values in the linked list 10 relative to a current node. The linked list 10 permits the nodes 20 to be stored at noncontiguous locations in the buffer memory.

A ground 50 represents a null or zero address stored in the next pointer 40-n. The null address indicates that the node 20-n is a final node in the linked list 10. Similarly, the previous pointer 30-1 stores a zero address value indicating that no previous nodes exist in the linked list 10.

Conventionally, a controller processes and stores linked lists in the buffer memory in the order the data is transmitted from the host system. An HDD system may require the linked lists to be reordered by an element contained in the node. The HDD system may also need to search the linked list to locate an element contained within the nodes. Typically, firmware (e.g. instructions stored in ROM, EPROM, and EEPROM) of a processor of the HDD system performs the sort and/or search operations on the linked list. Firmware accesses the nodes of a linked list sequentially in the buffer memory.

SUMMARY

A data management system for a data storage device comprises a management module and a memory module. The management module manages a plurality of nodes of a linked list based on one of a plurality of parameter sets that indicates a location of a data field within each of said plurality of nodes. The memory module stores data indicative of the one of said plurality of parameter sets.

In other features, the data field includes at least one of a previous pointer that points to a previous node of the linked list, a next pointer that points to a next node of the linked list, and a sort field that includes a data value. The management module includes a sort module that sorts the plurality of nodes of the linked list based on one of the plurality of parameter sets. The sort module modifies the previous pointer and the next pointer of each of the plurality of nodes based on the data values among each of the plurality of nodes. The sort module sorts said plurality of nodes based on input from a host and said data values.

In other features, the location includes at least one of an offset to the sort field, a width of the sort field, an offset to the next pointer, an offset to the previous pointer, a width of each of the plurality of nodes, a length of each of the plurality of nodes.

In other features, the management module generates at least one of the plurality of parameter sets based on said sort field of said linked list.

In other features, the management module includes a search module that searches at least one of the plurality of nodes of the linked list using one of the plurality of parameter sets. The said search module searches at least one of said plurality of nodes of said linked list based on input from a host.

In other features, the plurality of nodes of the linked list share a node structure. The management module selects one of the plurality of parameter sets based on input from a host. A hard disk drive includes the data management system. The data management system operates in parallel with other operations of the hard disk drive. The data comprises a context.

A data management system for a data storage device comprises management means for managing a plurality of nodes of a linked list based on one of a plurality of parameter sets that indicates a location of a data field within each of the plurality of nodes and memory means for storing data indicative of the one of the plurality of parameter sets.

In other features, the data field includes at least one of a previous pointer that points to a previous node of the linked list, a next pointer that points to a next node of the linked list, and a sort field that includes a data value. The management means includes sort means for sorting the plurality of nodes of the linked list based on one of the plurality of parameter sets. The sort means modifies the previous pointer and the next pointer of each of the plurality of nodes based on the data values among each of the plurality of nodes. The sort means sorts said plurality of nodes based on input from a host and said data values.

In other features, the location includes at least one of an offset to the sort field, a width of the sort field, an offset to the next pointer, an offset to the previous pointer, a width of each of the plurality of nodes, a length of each of the plurality of nodes.

In other features, the management means generates at least one of the plurality of parameter sets based on said sort field of the linked list.

In other features, the management means includes search means for searching at least one of the plurality of nodes of the linked list using one of the plurality of parameter sets. The search means searches at least one of the plurality of nodes of the linked list based on input from a host.

In other features, the plurality of nodes of the linked list share a node structure. The said management means selects one of the plurality of parameter sets based on input from a host. A hard disk drive includes the data management system. The data management system operates in parallel with other operations of the hard disk drive. The data comprises a context.

A data management method for a data storage device comprises managing a plurality of nodes of a linked list based on one of a plurality of parameter sets that indicates a location of a data field within each of the plurality of nodes and storing data indicative of the one of the plurality of parameter sets.

In other features, the data field includes at least one of a previous pointer that points to a previous node of the linked list, a next pointer that points to a next node of the linked list, and a sort field that includes a data value. The data management method further comprises sorting the plurality of nodes of the linked list based on one of the plurality of parameter sets. The data management method further comprises modifying the previous pointer and the next pointer of each of the plurality of nodes based on the data values among each of the plurality of nodes. The data management method further comprises sorting the plurality of nodes based on input from a host and the data values.

In other features, the location includes at least one of an offset to the sort field, a width of the sort field, an offset to the next pointer, an offset to the previous pointer, a width of each of the plurality of nodes, a length of each of the plurality of nodes.

In other features, the data management method further comprises generating at least one of the plurality of parameter sets based on the sort field of the linked list.

In other features, the data management method further comprising searching at least one of the plurality of nodes of the linked list using one of the plurality of parameter sets. The data management method further comprises searching at least one of the plurality of nodes of the linked list based on input from a host.

In other features, the plurality of nodes of the linked list share a node structure. The data management method further comprises selecting one of the plurality of parameter sets based on input from a host. A hard disk drive includes the data management method. The data management method operates in parallel with other operations of the hard disk drive. The data comprises a context.

A computer program stored for use by a processor for operating a data management system for in a storage device comprises managing a plurality of nodes of a linked list based on one of a plurality of parameter sets that indicates a location of a data field within each of the plurality of nodes and storing data indicative of the one of the plurality of parameter sets.

In other features, the data field includes at least one of a previous pointer that points to a previous node of the linked list, a next pointer that points to a next node of the linked list, and a sort field that includes a data value. The computer program further comprises sorting the plurality of nodes of the linked list based on one of the plurality of parameter sets. The computer program further comprises modifying the previous pointer and the next pointer of each of the plurality of nodes based on the data values among each of the plurality of nodes. The computer program further comprises sorting the plurality of nodes based on input from a host and the data values.

In other features, the location includes at least one of an offset to the sort field, a width of the sort field, an offset to the next pointer, an offset to the previous pointer, a width of each of the plurality of nodes, a length of each of the plurality of nodes.

In other features, the computer program further comprises generating at least one of the plurality of parameter sets based on the sort field of the linked list.

In other features, the computer program further comprising searching at least one of the plurality of nodes of the linked list using one of the plurality of parameter sets. The computer program further comprises searching at least one of the plurality of nodes of the linked list based on input from a host.

In other features, the plurality of nodes of the linked list share a node structure. The computer program further comprises selecting one of the plurality of parameter sets based on input from a host. A hard disk drive includes the computer program. The computer program operates in parallel with other operations of the hard disk drive. The data comprises a context.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 10A is a functional block diagram of a digital versatile disk (DVD);

FIG. 10B is a functional block diagram of a high definition television;

FIG. 10C is a functional block diagram of a vehicle control system;

FIG. 10D is a functional block diagram of a cellular phone;

DETAILED DESCRIPTION

Figure 1:
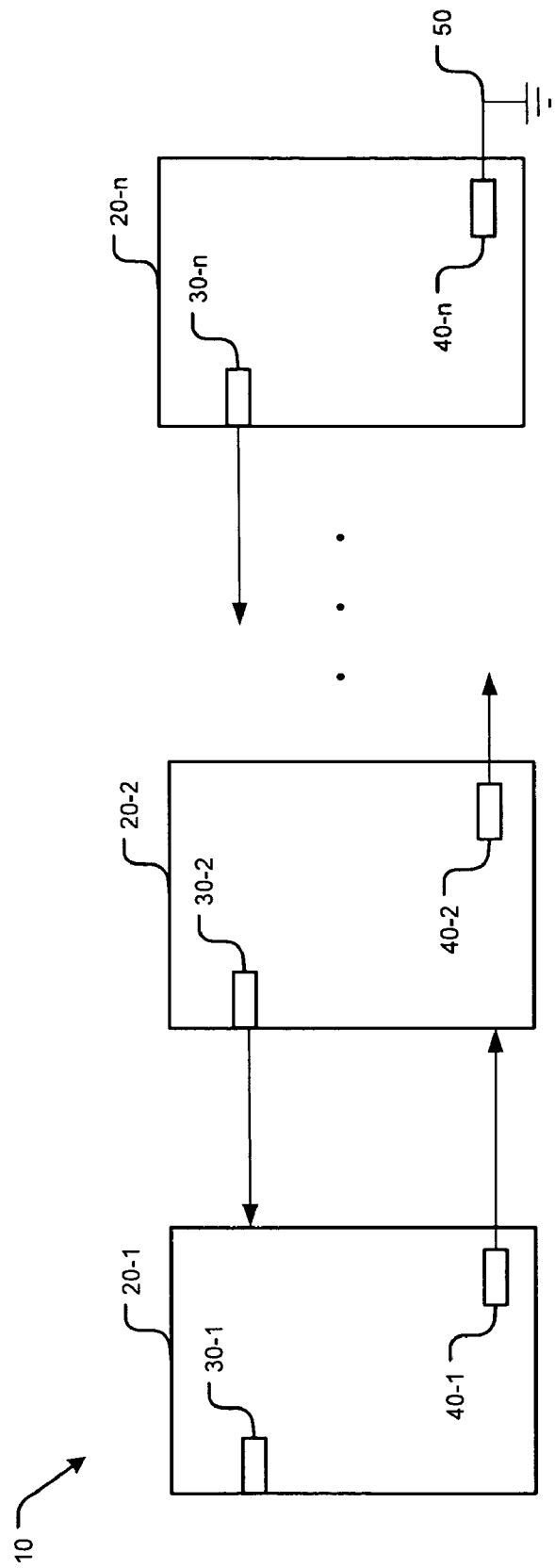
FIG. 1 illustrates a linked list according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

In conventional storage systems, using firmware of a processor of a hard disk drive (HDD) system to sort and search linked lists based on data elements contained within the nodes of the linked links can result in inefficiency of the HDD system. For example, while performing sort and/or search operations on the linked lists via the firmware, the HDD system is prevented from effectively performing other operations. A management module according to the present disclosure enables the HDD system to sort and/or search linked lists efficiently and in parallel with other system operations (e.g. task scheduler operations and input/output management operations).

Figure 2:
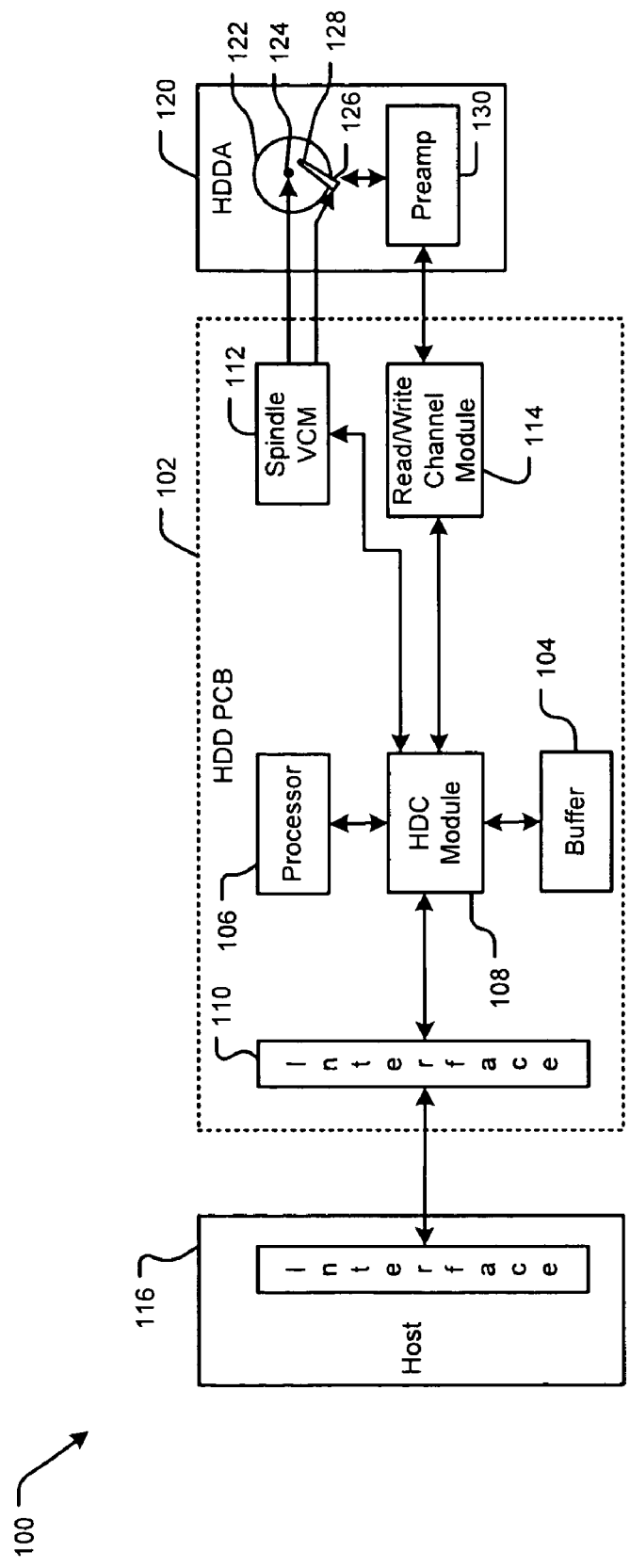
FIG. 2 is a functional block diagram of a hard disk drive (HDD) system according to the present disclosure.

Referring now to FIG. 2, an exemplary hard disk drive (HDD) system 100 that implements a data management system is shown to include a HDD printed circuit board (PCB) 102. A memory module such as buffer 104 stores read, write and/or volatile control data that is associated the control of the HDD system 100. The buffer 104 usually employs volatile memory having low latency. For example, SDRAM, double data rate (DDR), or other types of low latency memory may be used. Nonvolatile memory such as flash memory may also be provided to store critical data such as nonvolatile control code.

A processor 106 arranged on the HDD PCB 102 performs data and/or control processing that is related to the operation of the HDD system 100. A hard disk control (HDC) module 108 communicates with an input/output interface 110, with a spindle/voice coil motor (VCM) driver or module 112, and/or a read/write channel module 114. The HDC module 108 coordinates control of the spindle/VCM module 112, the read/write channel module 114, and the processor 106 and data input/output with a host 116 via the interface 110.

A hard disk drive assembly (HDDA) 120 includes one or more hard drive platters 122 that include magnetic coatings that store magnetic fields. The platters 122 are rotated by a spindle motor that is schematically shown at 124. Generally the spindle motor 124 rotates the hard drive platters 122 at a controlled speed during the read/write operations. One or more read/write arms 126 move relative to the platters 122 to read and/or write data to/from the hard drive platters 122. The spindle/VCM module 112 controls the spindle motor 124, which rotates the platters 122. The spindle/VCM module 112 also generates control signals that position the read/write arm 126, for example using a voice coil actuator, a stepper motor or any other suitable actuator.

During write operations, the read/write channel module 114 encodes the data to be written with a read/write device 128. The read/write channel module 114 processes the write signal for reliability and may apply, for example, error correction coding (ECC), run length limited coding (RLL), and the like. During read operations, the read/write channel module 114 converts an analog read signal output of the read/write device 128 to a digital read signal. The converted signal is then detected and decoded by known techniques to recover the data that was written on the platters 122.

The read/write device 128 is located near a distal end of the read/write arm 126. The read/write device 128 includes a write element such as an inductor that generates a magnetic field. The read/write device 128 also includes a read element (such as a magneto-resistive (MR) element) that senses the magnetic field on the platters 122. The HDDA 120 includes a preamplifier circuit or module 130 that amplifies the analog read/write signals. When reading data, the preamplifier module 130 amplifies low level signals from the read element and outputs the amplified signal to the read/write channel module 114. While writing data, a write current is generated that flows through the write element of the read/write device 128. The write current is switched to produce a magnetic field having a positive or negative polarity. The positive or negative polarity is stored by the hard drive platters 122 and is used to represent data.

The data is stored on the platters 122 in sectors. Each sector is byte structured and includes various fields according to a sector format. Typically, a sector format includes a logical block address (LBA) field followed by a data field, a cyclic redundancy check (CRC) checksum field, and/or an ECC field. For example, the LBA field may include 4 bytes data, the data field may include 512 bytes of data, the CRC checksum field may include 4 bytes of data, and the ECC field may include 40-80 bytes of data. The LBA includes position information such as cylinder, head, and/or sector numbers.

Portions of the HDD system 100 may be implemented by one or more integrated circuits (IC) or chips. For example, the processor 106 and the HDC module 108 may be implemented by a single chip. The spindle/VCM module 112 and/or the read/write channel module 114 may also be implemented by the same chip as the processor 106, the HDC module 108 and/or by additional chips. Alternatively, most of the HDD system 100 other than the HDDA 120 may be implemented as a system on chip (SOC).

Figure 3:
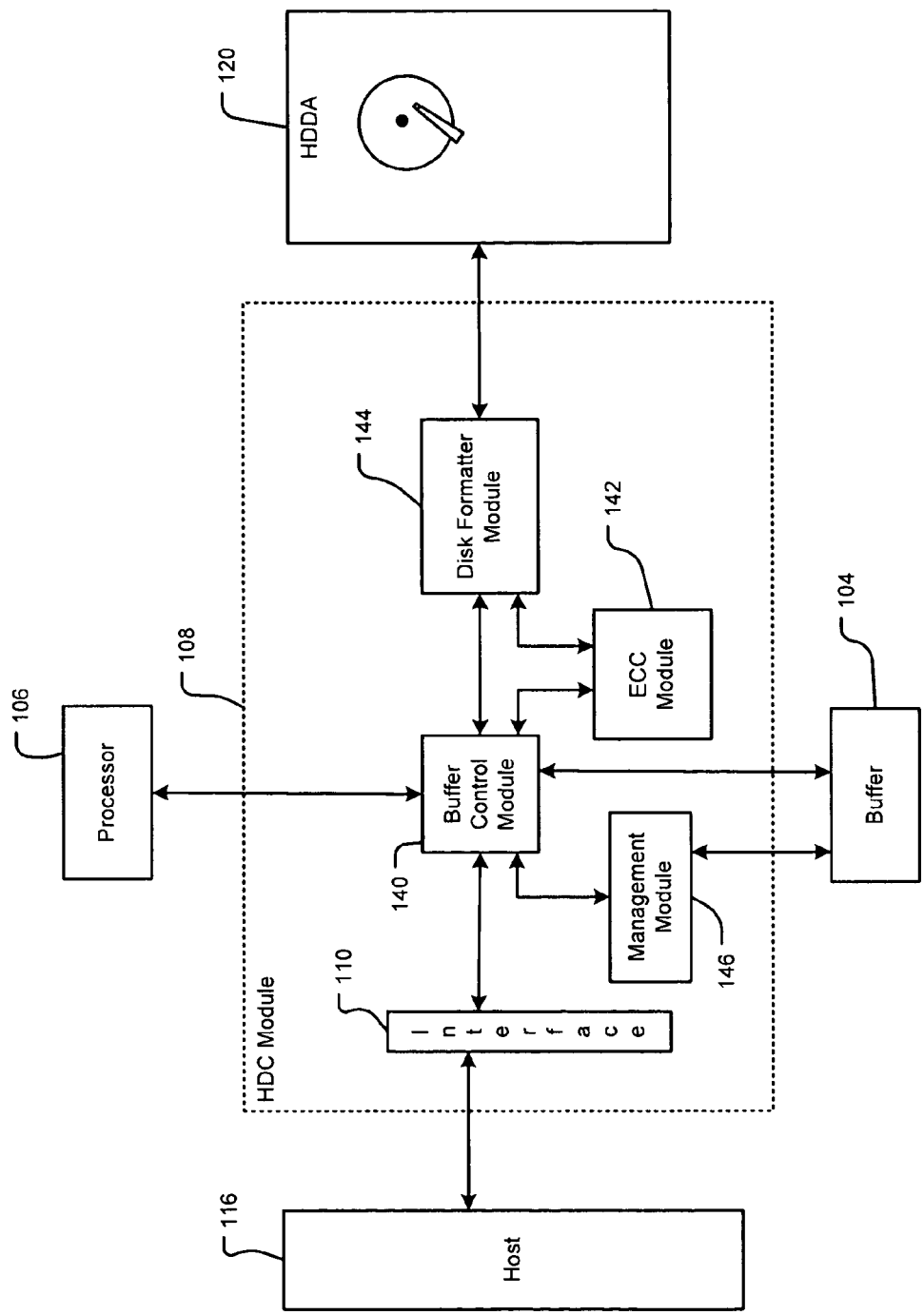
FIG. 3 is a functional block diagram of a hard disk control (HDC) module according to the present disclosure.

Referring now to FIG. 3, the HDC module 108 is shown in more detail. The HDC module 108 implements a data management system. The HDC module 108 communicates with the buffer 104, the processor 106, the host 116, and the HDDA 120 as described in FIG. 2. The HDC module 108 includes a buffer control module 140, an ECC module 142, a disk formatter module 144, and a management module 146.

The buffer control module 140 (e.g. a direct memory access (DMA) controller) connects the buffer 104 to the disk formatter module 144, the ECC module 142, the management module 146, the host 116, the processor 106, and the HDDA 120. The buffer control module 140 regulates data movement in and out of the buffer 104.

The management module 146 communicates with the host 116 (via the interface 110) and the buffer control module 140. The interface 110 processes frame-based information including, but not limited to, Serial Attached Small (SAS) Computer Interface frames and fiber channel frames received from the host 116. The interface 110 transmits frames received from the host 116 to the buffer control module 140.

The host 116 sends read and write commands to the HDC module 108. The HDC module 108 stores the read and write commands in the buffer 104. The processor 106 receives the read and write commands from the buffer 104 and executes firmware to control the HDC module 108 accordingly. During read operations, the HDC module 108 reads data corresponding to the read commands from the HDDA 120. The buffer control module 140 and the ECC module 142 receive the data from the HDDA 120. The ECC module 142 provides an ECC mask for errors that may have occurred during read operations while the data is still in the buffer control module 140. After any errors in the data are corrected, the data is transferred to the buffer 104. The data is then transferred from the buffer 104 to the host 116.

Prior to write operations, the management module 146 implements the data management system. The management module 146 controls data and/or information communicated from the host 116 to the buffer 104 and/or communicated from the buffer 104 to the host 116. The management module 146 processes data (e.g. linked lists) stored in the buffer 104. For example, the management module 146 sorts and/or searches the linked lists based on input from the host 116. The linked list is stored to the buffer 104 via the buffer control module 140.

In various embodiments, an existing integrated circuit and/or additional integrated circuits may implement the management module 146. For example, the buffer control module 140 may include the management module 146. Alternatively, the management module 146 may be implemented as a SOC.

During write operations, the disk formatter module 144 controls writing of data to the HDDA 120. The buffer 104 receives data to be written according to the write commands via the HDC module 108. The disk formatter module 144 receives the data from the buffer 104 via the HDC module 108. The disk formatter module 144 formats the data for writing to the HDDA 120. For example, the disk formatter module 144 adds error correction codes to the data, monitors a position of the read/write heads, and writes the data to the read/write heads as described in FIG. 2.

Figure 4:
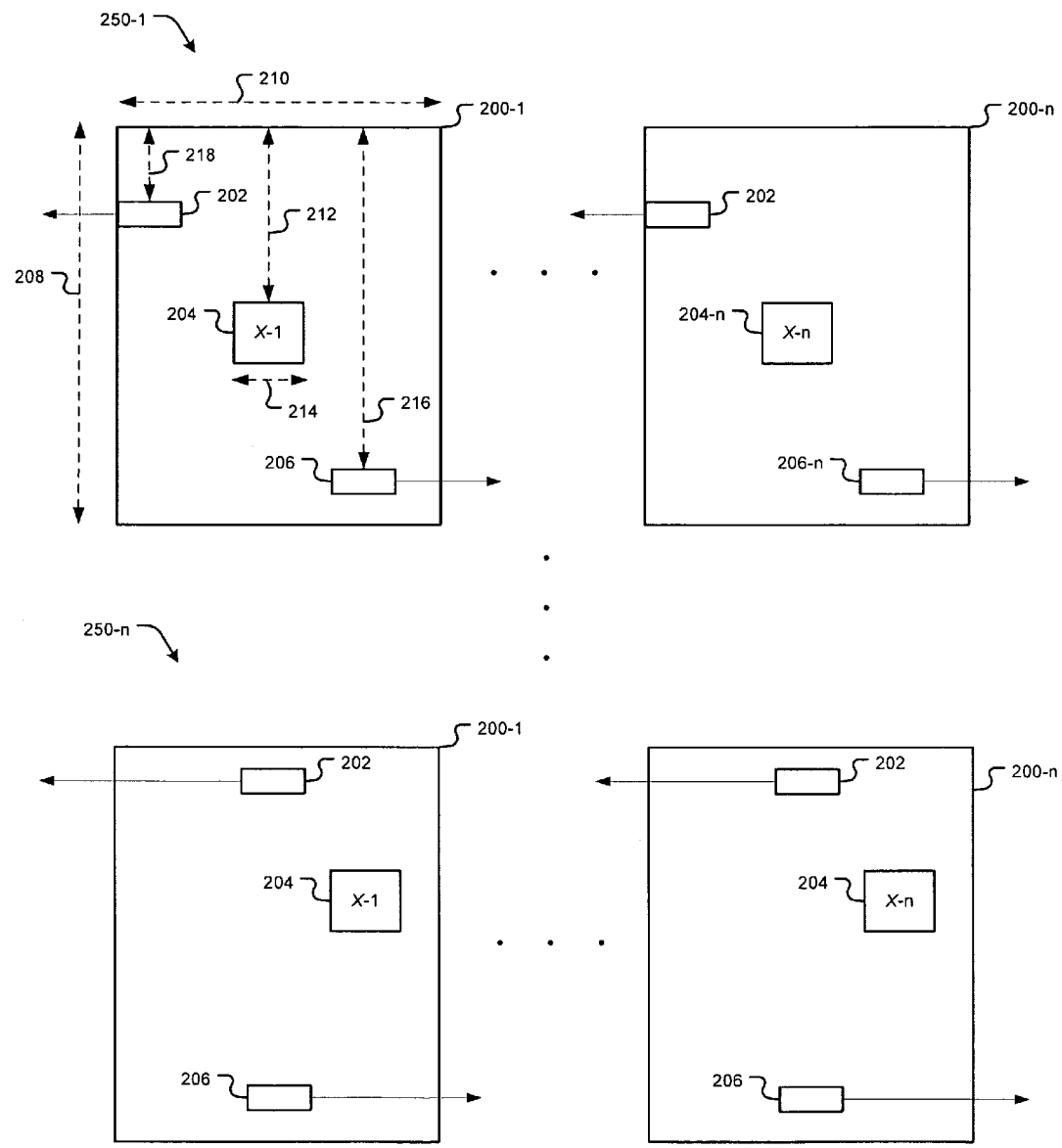
FIG. 4 illustrates exemplary linked lists according to the present disclosure.

FIG. 4 illustrates linked lists 250-1, . . . , and 250-n, referred to collectively as linked lists 250. Each of the linked lists 250 include nodes 200-1, . . . , and 200-n, referred to collectively as nodes 200. Those skilled in the art can appreciate that linked list 250-1 is exemplary in nature.

The nodes 200 include data fields that include, but are not limited to, previous pointers 202, sort fields 204, and next pointers 206. Node 200-1 illustrates an exemplary node of the linked list 250-1 according to the present implementation. The previous pointer 202 of the node 200-1 stores an address of a node (not shown) including a previous data value in the linked list 250-1 relative to the node 200-1. The next pointer 206 of the node 200-1 stores an address of a node (not shown) including the next data value in the linked list 250-1 relative to the node 200-1. Those skilled in the art can appreciate that the linked list is not limited to any particular size. In the present implementation, a linked list can be modified by insertion and/or deletion of nodes in and/or from the linked list. Additionally, a previous pointer can contain a zero value if the node is a first node of the linked list. Similarly, a next pointer can contain a zero value if the node is a last node of the linked list.

As shown in node 200-1 of linked list 250-1, a parameter set includes parameters 208, 210, 212, 214, 216, and 218 that characterize the node 200-1 in bits. It is anticipated that the parameter set can include fewer or additional parameters. Parameter 208 indicates a length of the node 200-1. Parameter 210 indicates a width of the node 200-1. In an exemplary embodiment, the parameters 208 and 210 can be 32 bits and 20 bits, respectively. Parameters 212, 214, 216, and 218 indicate an offset to the sort field 204, a width of the sort field 204, an offset to the next pointer 206, and an offset to the previous pointer 202 of the node 200-1, respectively. Data X–1, . . . , and X-n, referred to collectively as data X, represent data contained within the sort fields 204 of the linked list 250-1. In an exemplary embodiment, data X can include, but is not limited to, timestamp information and LBA information. Those skilled in the art can appreciate that each of the linked lists 250 can include multiple sort fields 204 that are based on input supplied by the host 116.

The present implementation anticipates that the parameters 208, 210, 212, 214, 216, and 218 can be of variable size and location. Additionally, in accordance with the present implementation, each of the nodes 200 of the linked lists 250 maintains the same structure as the node 200-1 of the linked lists 250. However, it should be understood that one or more of the nodes 200 of the linked lists 250 may utilize a different structure. The management module 146 can process various types of the linked lists 250 and can obtain parameter sets characterizing each of the nodes 200 of the linked lists 250.

Figure 5:
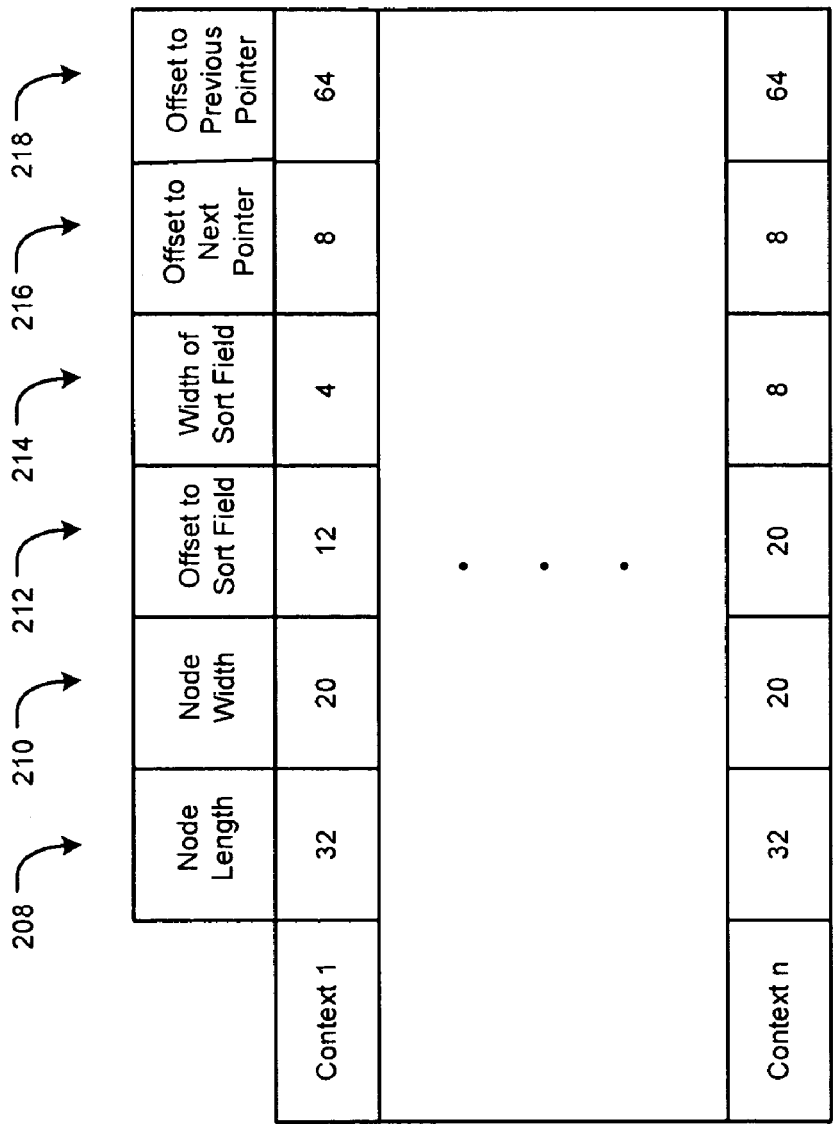
FIG. 5 illustrates an organizational chart of the linked lists according to the present disclosure.

FIG. 5 is a chart that illustrates an organization scheme of the parameter sets of the exemplary linked list 250-1 as stored by the management module 146. The management module 146 stores the parameter sets based on the sort field 204. As discussed previously, the linked list 250-1 can include multiple sort fields 204. Context 1, . . . , and context n, referred to collectively as contexts, each correspond to a particular sort field 204 of the linked list 250-1. Each of the contexts identifies a distinct parameter set of the linked list 250-1. For example, context 1 is based in part on LBA data stored within each of the nodes 200 of the linked list 250-1. Context 1 is depicted to further include exemplary values of the parameters 208, 210, 212, 214, 216, and 218 that are based on the logical block addresses, previous pointers 202, and next pointers 206 of the linked list 250-1. The management module 146 generates the contexts and stores the contexts to memory upon an initial sort or search request supplied from the host 116 for a distinct sort field 204 of one of the linked lists 250. During a sort or search operation, the management module 146 selects one of the contexts that corresponds to a distinct parameter set based on input provided by the host 116 to efficiently locate and process the sort fields 204, thereby eliminating the need for intervention by the processor 106. The management module 146 and processor 106 can operate in parallel, which increases the efficiency of the HDD system 100.

Figure 6:
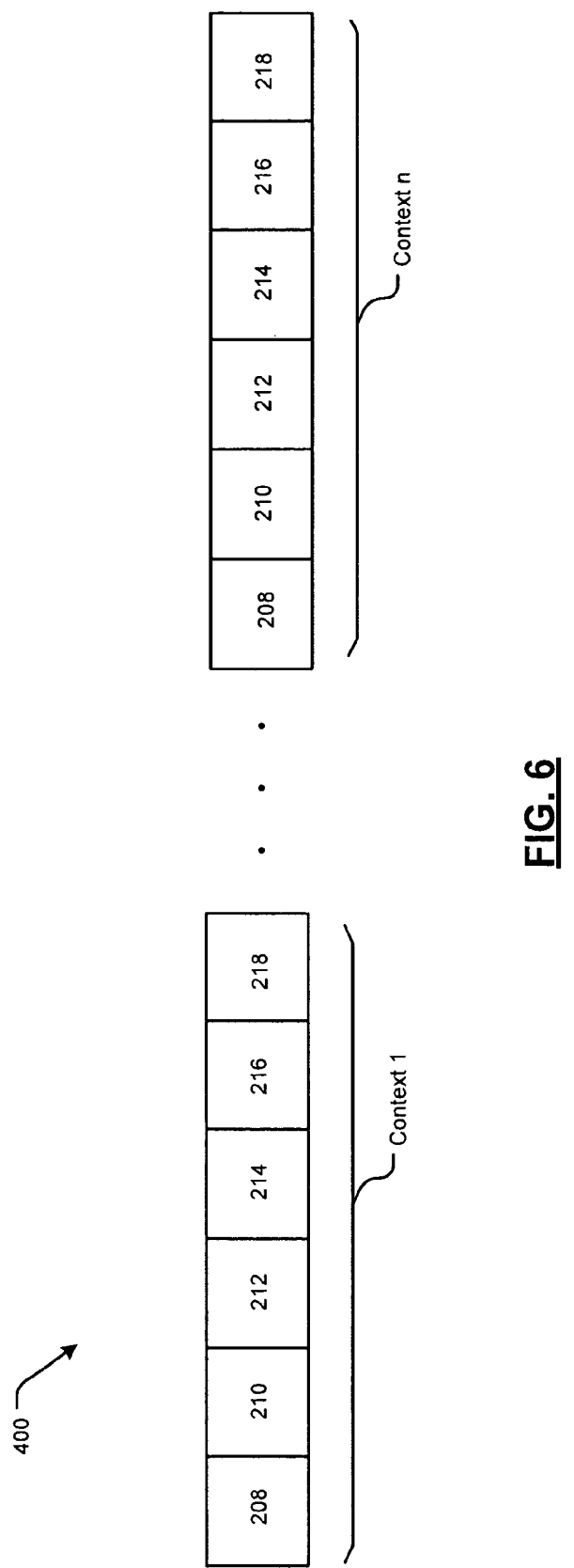
FIG. 6 illustrates a data block according to the present disclosure.

Referring now to FIG. 6, a data block 400 stored in the management module 146 will be described in more detail. The data block 400 includes the contexts that identify a distinct parameter set of a linked list as referred to in FIG. 5. The present implementation anticipates that contexts can be of variable size.

Figure 7:
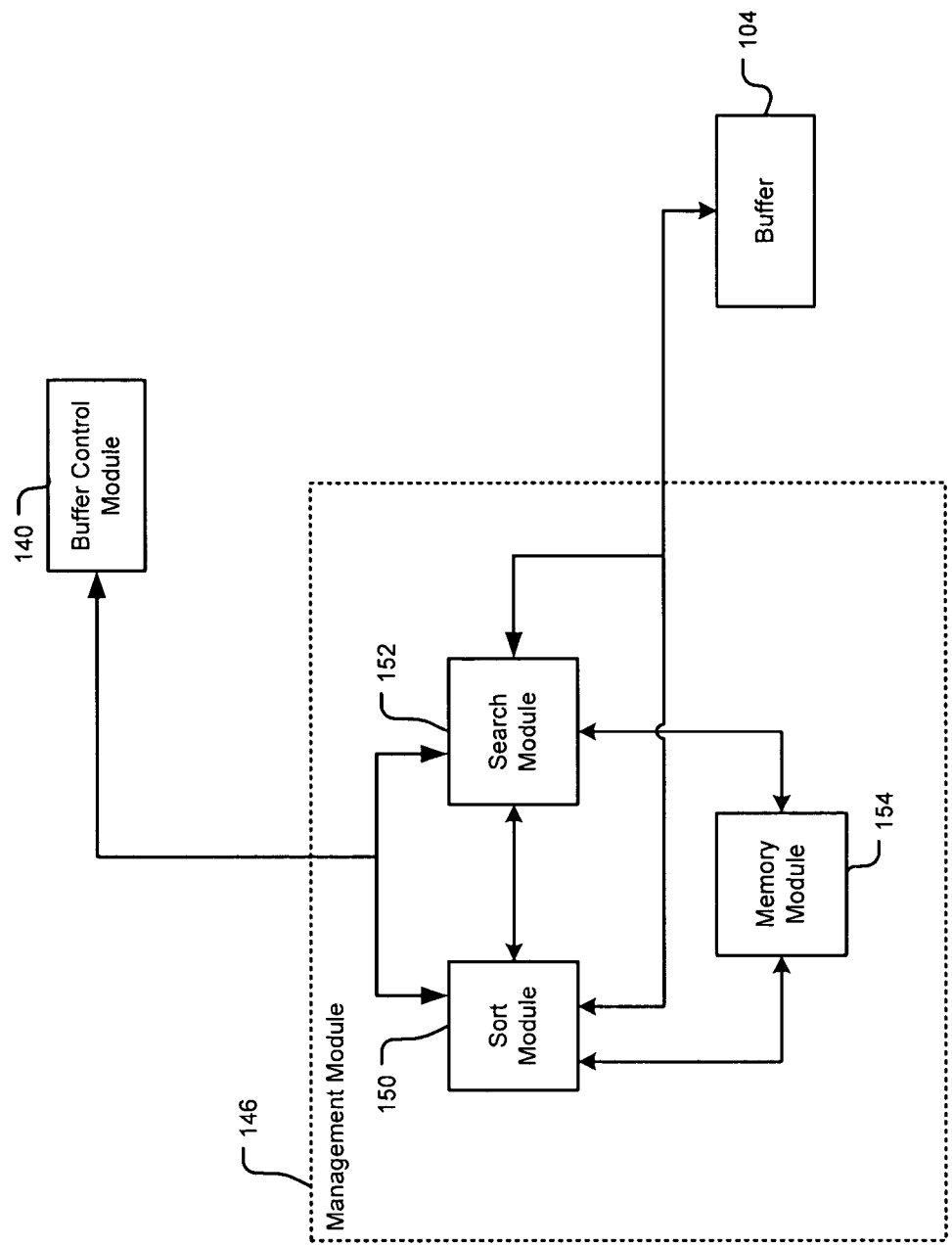
FIG. 7 is a functional block diagram of the data management module according to the present disclosure.

Referring now to FIG. 7, the management module 146 is shown in more detail. The management module 146 includes a sort module 150, a search module 152, and a memory module 154. The management module 146 determines whether to perform a sort or search operation and which context to use based on input provided by the host 116 (via the buffer control module 140). As noted previously, during sort or search operations, the management module 146 selects one of the contexts stored in the memory module 154 based on input provided by the host 116. In the present implementation, each context corresponds to a distinct sort field 204 contained within one of the linked lists 250.

During a sort operation, the sort module 150 receives input provided by the host 116. The sort module 150 determines which context to use to perform the sort operation based on the input from the host 116. The sort module 150 reads the parameter set that corresponds to requested context from the memory module 154. In the present implementation, the sort module 150 processes the linked list 250-1 stored in the buffer 104 and sorts the nodes 200 of the linked list 250-1 in an order based on the data X stored in the sort field 204 of the nodes 200 and a request (e.g. ascending data order or descending data order) provided by the host 116. The management module 146 modifies the previous pointers 202 and the next pointers 206 in the buffer 104 to arrange the nodes 200 into the requested sequence.

During a search operation, the search module 152 receives input provided by the host 116. The search module 152 determines which context to use to perform the search operation based on the input from the host 116. The search module 152 reads the parameter set that corresponds to requested context from the memory module 154. In the present implementation, the search module 152 processes the linked list 250-1 read from the buffer 104 and locates the sort field 204 requested by the host 116.

Figure 8:
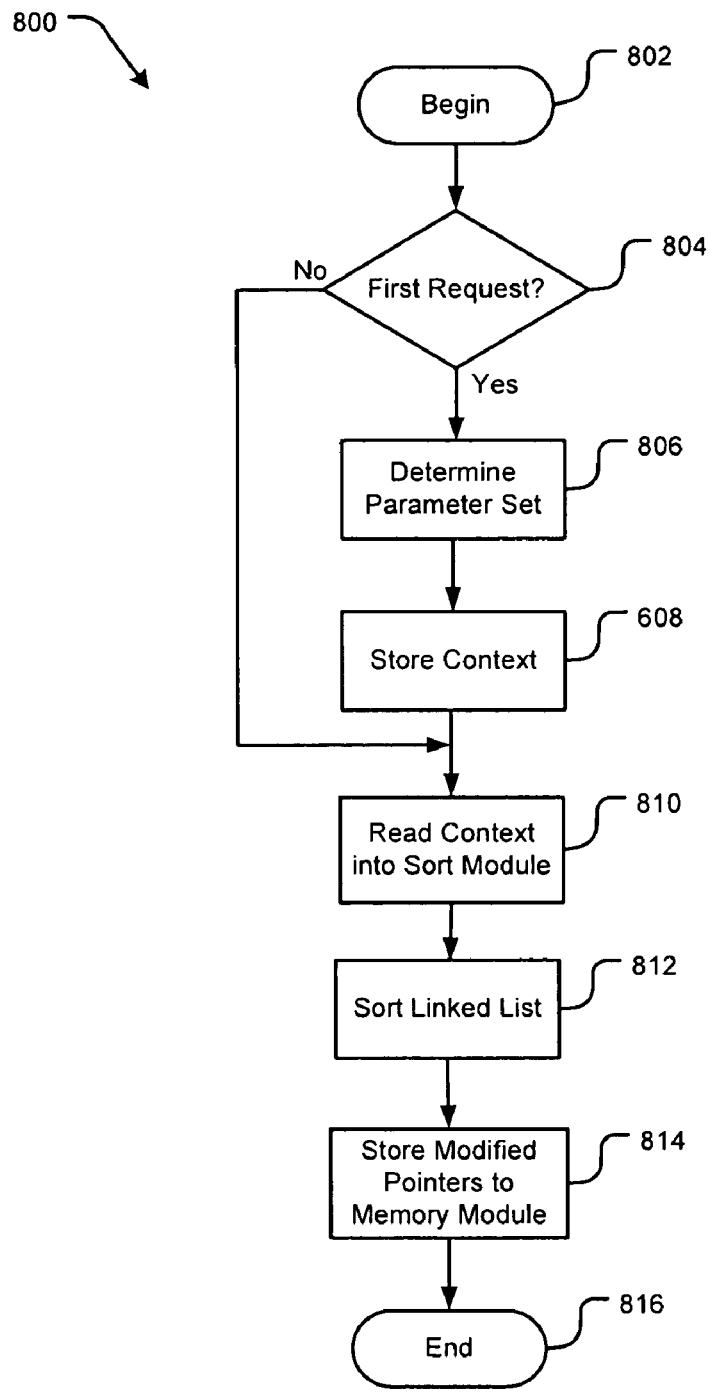
FIG. 8 is a flow diagram for sorting linked lists according to the present disclosure.

Referring now to FIG. 8, a method 800 for performing a sort operation is shown in more detail. The method 800 begins in step 802. In step 804, the sort module 150 determines whether the request from the host 116 is the first request for a distinct sort field 204 of one of the linked lists 250. If the request is not the first request, the sort module 150 proceeds to step 810. If the request is the first request for a distinct sort field 204 of the linked list 250-1, the sort module 150 proceeds to step 806. In step 806, the sort module 150 determines the parameter set corresponding to the request from the host 116.

In step 808, the sort module 150 stores the parameter set as a context in memory module 154. In step 810, the sort module 150 reads the requested context from memory module 154. In step 812, the sort module 150 sorts the nodes 200 of the linked list 250-1 based on the data X stored in the sort field 204 and the request supplied by the host 116. In step 814, the sort module 150 stores the modified previous pointers 202 and next pointers 206 to the buffer 104. The method 800 ends in step 816.

Figure 9:
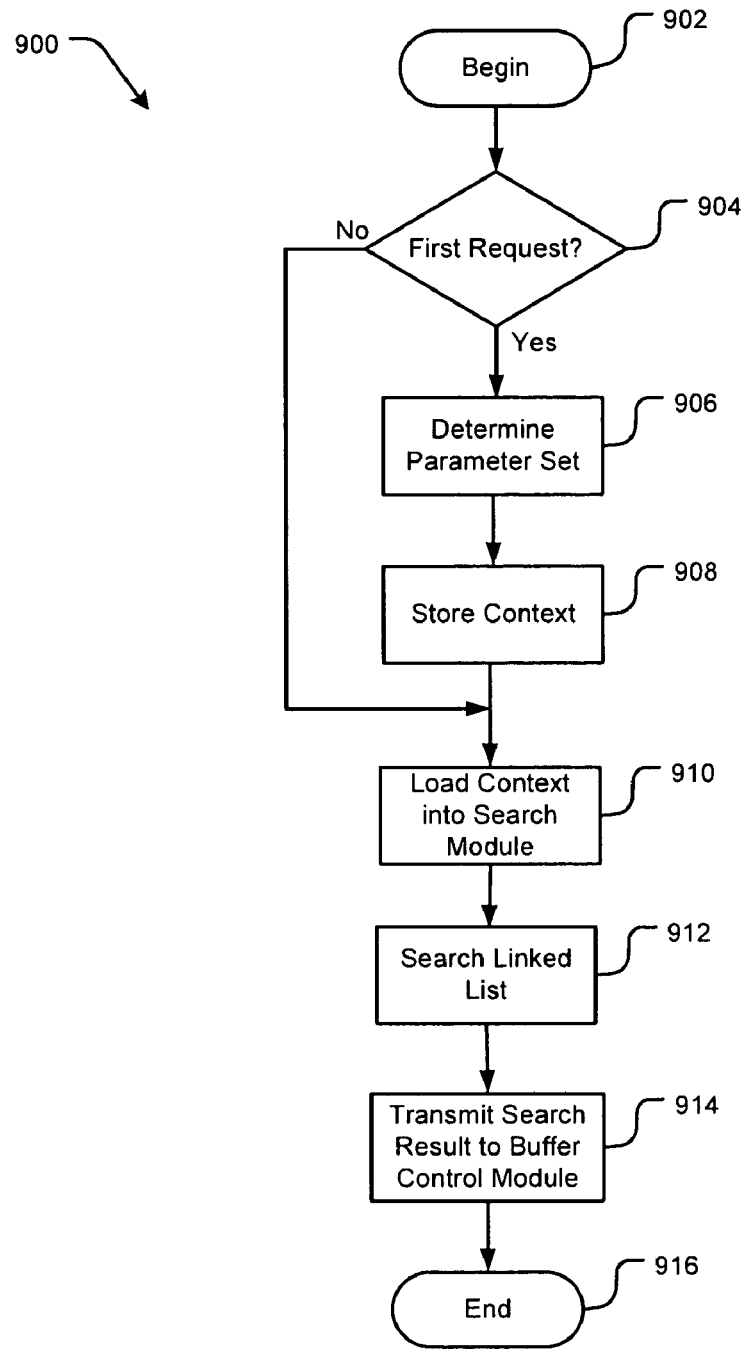
FIG. 9 is a flow diagram for searching linked lists according to the present disclosure.

Referring now to FIG. 9, a method 900 for performing a search operation is shown in more detail. The method 900 begins in step 902. In step 904, the search module 152 determines whether the request from the host 116 is the first request for a distinct sort field 204 of one of the linked lists 250. If the request is not the first request, the search module 152 proceeds to step 910. If the request is the first request for a distinct sort field 204 of the linked list 250-1, the search module 152 proceeds to step 906. In step 906, the search module 152 determines the parameter set corresponding to the request from the host 116.

In step 908, the search module 152 stores the parameter set as a context in memory module 154. In step 910, the search module 152 reads the requested context from memory module 154. In step 912, the search module 152 searches the nodes 200 of the linked list 250-1 based on the request supplied by the host 116. In step 814, the search module 152 transmits a result of the search operation to the buffer control module 140. The method 900 ends in step 916.

Figure 10F:
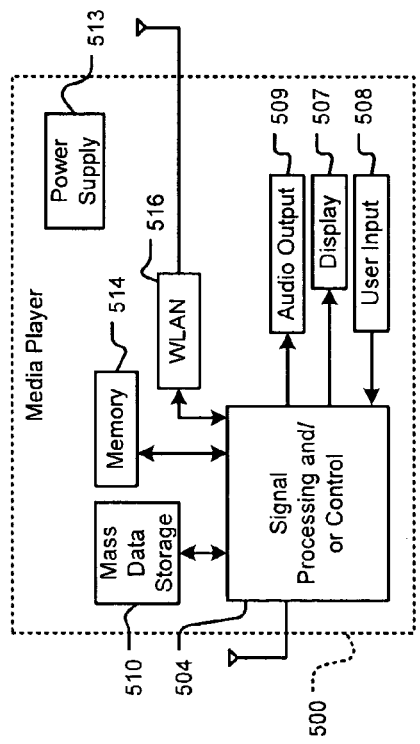
FIG. 10F is a functional block diagram of a media player.

Referring now to FIGS. 10A-10F, various exemplary implementations of the device are shown. As shown in FIG. 10A, the data management system can be implemented in a mass data storage of a digital versatile disc (DVD) drive 410. The DVD drive 410 includes either or both signal processing and/or control circuit, which are generally identified in FIG. 10A at 412, mass data storage 418 and/or a power supply 413. The mass data storage 418 (e.g. an HDD) may implement the data management system. The signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD drive 410 may communicate with mass data storage 418 that stores data in a nonvolatile manner. The mass data storage 418 may include a hard disk drive (HDD). The HDD may have the configuration shown in FIG. 2. The HDD may be a mini HDD that includes one or more platters having a diameter that is smaller than approximately 1.8". The DVD drive 410 may be connected to memory 419 such as RAM, ROM, low latency nonvolatile memory such as flash memory and/or other suitable electronic data storage.

Referring now to FIG. 10B, the data management system can be implemented in a mass data storage of a high definition television (HDTV) 420. The HDTV 420 includes either or both signal processing and/or control circuit, which are generally identified in FIG. 9B at 422, a WLAN interface 429, mass data storage 627 and/or a power supply 423. The mass data storage 427 (e.g. an HDD) may implement the data management system. For example, the mass data storage 427 may include one or more buffer memories that temporarily store data that is transmitted to and from the HDTV 420. The memory controller module that manages the buffer memories may implement the data management system. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices including DVD drives and HDDs. At least one HDD may have the configuration shown in FIG. 2 and/or at least one DVD drive may have the configuration shown in FIG. 10A. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via the WLAN interface 429.

Referring now to FIG. 10C, the vehicle 430 includes a powertrain control system 432, a WLAN interface 448, mass data storage 446 and/or a power supply 433. The mass data storage 446 (e.g. an HDD) may implement the data management system. For example, the mass data storage 446 may include one or more buffer memories that temporarily store data that is transmitted to and from the powertrain control system 432. The memory controller module that manages the buffer memories may implement the data management system. In some implementations, the powertrain control system 432 receives inputs from one or more sensors 436 such as temperature sensors, pressure sensors, rotational sensors, airflow sensors and/or any other suitable sensors and/or that generates one or more output control signals 438 such as engine operating parameters, transmission operating parameters, and/or other control signals.

The data management system may also be implemented in other control system 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc system and the like. Still other implementations are contemplated.

The powertrain control system 432 may communicate with mass data storage 446 that stores data in a nonvolatile manner. The mass data storage 446 may include optical and/or magnetic storage devices such as hard disk drives (HDDs) and/or DVD drives. At least one HDD may have the configuration shown in FIG. 2 and/or at least one DVD drive may have the configuration shown in FIG. 10A. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via the WLAN interface 448. The control system 440 may also include mass data storage, memory and/or a WLAN interface (all not shown).

Referring now to FIG. 10D, the data management system can be implemented in a mass data storage of a cellular phone 450 that may include a cellular antenna 451. The cellular phone 450 includes either or both signal processing and/or control circuit, which are generally identified in FIG. 10D at 452, a WLAN interface 468, mass data storage 464 and/or a power supply 453. The mass data storage 464 (e.g. an HDD) of the cellular phone 450 may implement the data management system. For example, the mass data storage 464 may include one or more buffer memories that temporarily store data that is transmitted to and from the cellular phone 450. The memory controller module that manages the buffer memories may implement the data management system. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuit 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices including hard disk drives (HDDs) and/or DVD drives. At least one HDD may have the configuration shown in FIG. 2 and/or at least one DVD drive may have the configuration shown in FIG. 10A. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via the WLAN interface 468.

Figure 10E:
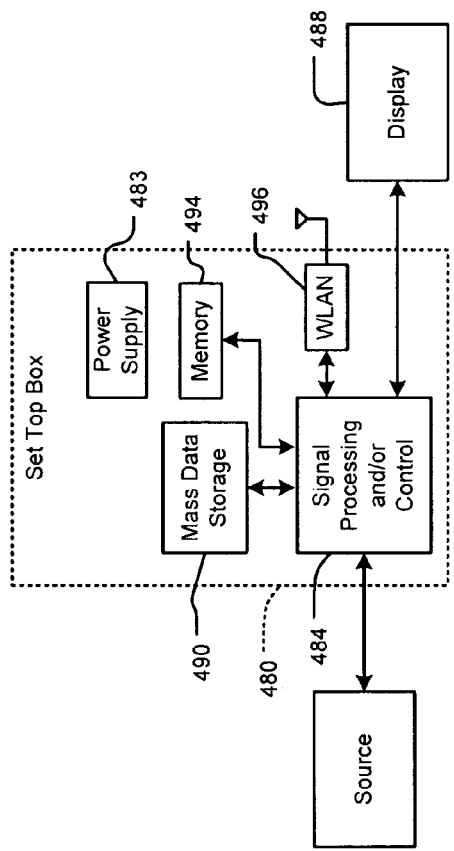
FIG. 10E is a functional block diagram of a set top box.

Referring now to FIG. 10E, the data management system can be implemented in a mass data storage of a set top box 480. The set top box 480 includes either or both signal processing and/or control circuit, which are generally identified in FIG. 10E at 484, a WLAN interface 496, mass data storage 490 and/or a power supply 483. The mass data storage 490 (e.g. an HDD) of the set top box 480 may implement the data management system. For example, the mass data storage 490 may include one or more buffer memories that temporarily store data that is transmitted to and from the set top box 480. The memory controller module that manages the buffer memories may implement the data management system. The set top box 480 receives signals from a source such as a broadband source and outputs standard and/or high definition audio/video signals suitable for a display 488 such as a television, a monitor and/or other video and/or audio output devices. The signal processing and/or control circuit 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices such as hard disk drives (HDDs) and/or DVD drives. At least one HDD may have the configuration shown in FIG. 2 and/or at least one DVD drive may have the configuration shown in FIG. 10A. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via the WLAN interface 496.

Referring now to FIG. 10F, the data management system can be implemented in a mass data storage of a media player 500. The media player 500 includes either or both signal processing and/or control circuit, which are generally identified in FIG. 10F at 504, a WLAN interface 516, mass data storage 510 and/or a power supply 513. The mass data storage 510 (e.g. an HDD) of the media player 500 may implement the data management system. For example, the mass data storage 510 may include one or more buffer memories that temporarily store data that is transmitted to and from the media player 500. The memory controller module that manages the buffer memories may implement the data management system. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuit 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage 510 may include optical and/or magnetic storage devices such as hard disk drives (HDDs) and/or DVD drives. At least one HDD may have the configuration shown in FIG. 2 and/or at least one DVD drive may have the configuration shown in FIG. 10A. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via the WLAN interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A data management system for a data storage device, the data management system comprising:
   a management module configured to (i) select one of a plurality of parameter sets and (ii) manage a plurality of nodes of a linked list based on the selected one of the plurality of parameter sets, wherein the selected one of the plurality of parameter sets includes an offset, and wherein the offset specifies a relative location of a predetermined field within each of the plurality of nodes; and
   a memory module configured to store data indicative of the plurality of parameter sets;
   wherein:
      each of the plurality of nodes includes a timestamp and a logical block address,
      a first one of the plurality of parameter sets includes an offset that specifies a relative location of the timestamp within each of the plurality of nodes, and
      a second one of the plurality of parameter sets includes an offset that specifies a relative location of the logical block address within each of the plurality of nodes.

2. The data management system of claim 1, wherein the predetermined field includes at least one of a previous pointer that points to a previous node of the linked list, a next pointer that points to a next node of the linked list, and a sort field that includes a data value.

3. The data management system of claim 2, wherein the management module includes a sort module configured to sort the plurality of nodes of the linked list based on the selected one of the plurality of parameter sets.

4. The data management system of claim 3, wherein the sort module is configured to modify the previous pointer and the next pointer of each of the plurality of nodes based on the data value of each of the plurality of nodes.

5. The data management system of claim 3, wherein the sort module is configured to sort the plurality of nodes based on input from a host and the data value of each of the plurality of nodes.

6. The data management system of claim 2, wherein the offset includes at least one of an offset to the sort field, an offset to the next pointer, and an offset to the previous pointer.

7. The data management system of claim 2, wherein the management module is configured to generate at least one of the plurality of parameter sets based on the sort field of the linked list.

8. The data management system of claim 2, wherein the management module includes a search module configured to search at least one of the plurality of nodes of the linked list using the selected one of the plurality of parameter sets.

9. The data management system of claim 8, wherein the search module is configured to search at least one of the plurality of nodes of the linked list based on input from a host.

10. The data management system of claim 1, wherein the plurality of nodes of the linked list share a node structure.

11. The data management system of claim 1, wherein the management module is configured to select the selected one of the plurality of parameter sets based on input from a host.

12. The data management system of claim 1, wherein:
    the predetermined field is a data field,
    the selected one of the plurality of parameter sets further includes a second offset and a third offset,
    the second offset specifies a relative location of a next node pointer within each of the plurality of nodes, and
    the third offset specifies a relative location of a previous node pointer within each of the plurality of nodes.

13. The data management system of claim 1, wherein the management module is configured to sort the plurality of nodes based on respective data values stored at the location specified by the offset within each of the plurality of nodes.

14. The data management system of claim 1, wherein the management module is configured to search the plurality of nodes based on respective data values stored at the location specified by the offset within each of the plurality of nodes.

15. The data management system of claim 1, wherein
    each of the plurality of parameter sets includes a first offset value, a second offset value, and a third offset value that specify relative locations of a data field, a next node pointer, and a previous node pointer, respectively, within each of the plurality of nodes, and
    the offset, the second offset, and the third offset are the first offset value, the second offset value, and the third offset value, respectively, of the selected one of the plurality of parameter sets.

16. The data management system of claim 15, wherein each of the plurality of parameter sets corresponds to a different data field.

17. The data management system of claim 1, wherein the management module is configured to select:
    the first one of the plurality of parameter sets when a host requests one of a search based on timestamp and a sort based on timestamp, and
    the second one of the plurality of parameter sets when the host requests one of a search based on logical block address and a sort based on logical block address.

18. The data management system of claim 1, wherein the management module is configured to generate the plurality of parameter sets.

19. The data management system of claim 18, wherein the management module is configured to generate the plurality of parameter sets in response to receiving (i) an initial request for a sort or (ii) an initial request for a search.

20. A hard disk drive (HDD) that includes the data management system of claim 1.

21. A data management method for a data storage device, the data management method comprising:
    selecting one of a plurality of parameter sets;
    managing a plurality of nodes of a linked list based on the selected one of the plurality of parameter sets, wherein the selected one of the plurality of parameter sets includes an offset, and wherein the offset specifies a relative location of a predetermined field within each of the plurality of nodes; and
    storing data indicative of the plurality of parameter sets;
    wherein:
       each of the plurality of nodes includes a timestamp and a logical block address,
       a first one of the plurality of parameter sets includes an offset that specifies a relative location of the timestamp within each of the plurality of nodes, and
       a second one of the plurality of parameter sets includes an offset that specifies a relative location of the logical block address within each of the plurality of nodes.

22. The data management method of claim 21, wherein the predetermined field includes at least one of a previous pointer that points to a previous node of the linked list, a next pointer that points to a next node of the linked list, and a sort field that includes a data value.

23. The data management method of claim 22, further comprising sorting the plurality of nodes of the linked list based on the selected one of the plurality of parameter sets.

24. The data management method of claim 23, further comprising modifying the previous pointer and the next pointer of each of the plurality of nodes based on the data value of each of the plurality of nodes.

25. The data management method of claim 23, further comprising sorting the plurality of nodes based on input from a host and the data value of each of the plurality of nodes.

26. The data management method of claim 22, wherein the offset includes at least one of an offset to the sort field, an offset to the next pointer, and an offset to the previous pointer.

27. The data management method of claim 22, further comprising generating at least one of the plurality of parameter sets based on the sort field of the linked list.

28. The data management method of claim 22, further comprising searching at least one of the plurality of nodes of the linked list using the selected one of the plurality of parameter sets.

29. The data management method of claim 28, further comprising searching at least one of the plurality of nodes of the linked list based on input from a host.

30. The data management method of claim 21, wherein the plurality of nodes of the linked list share a node structure.

31. The data management method of claim 21, further comprising selecting the selected one of the plurality of parameter sets based on input from a host.

32. The data management method of claim 21, wherein:
the predetermined field is a data field,
the selected one of the plurality of parameter sets further includes a second offset and a third offset,
the second offset specifies a relative location of a next node pointer within each of the plurality of nodes, and
the third offset specifies a relative location of a previous node pointer within each of the plurality of nodes.

33. The data management method of claim 21, further comprising sorting the plurality of nodes based on respective data values stored at the location specified by the offset within each of the plurality of nodes.

34. The data management method of claim 21, further comprising searching the plurality of nodes based on respective data values stored at the location specified by the offset within each of the plurality of nodes.

35. The data management method of claim 21, wherein
each of the plurality of parameter sets includes a first offset value, a second offset value, and a third offset value that specify relative locations of a data field, a next node pointer, and a previous node pointer, respectively, within each of the plurality of nodes, and
the offset, the second offset, and the third offset are the first offset value, the second offset value, and the third offset value, respectively, of the selected one of the plurality of parameter sets.

36. The data management method of claim 35, wherein each of the plurality of parameter sets corresponds to a different data field.

37. The data management method of claim 21, further comprising:
selecting the first one of the plurality of parameter sets when a host requests one of a search based on timestamp and a sort based on timestamp; and
selecting the second one of the plurality of parameter sets when the host requests one of a search based on logical block address and a sort based on logical block address.

38. The data management method of claim 21, further comprising generating the plurality of parameter sets in response to receiving (i) an initial request for a sort or (ii) an initial request for a search.

39. A hard disk drive (HDD) that performs the data management method of claim 21.

* * * * *